United States Patent [19]
Jordan

[11] Patent Number: 5,727,948
[45] Date of Patent: Mar. 17, 1998

[54] SYRINGE INJECTION PRACTICE DEVICE

[76] Inventor: Lynette S. Jordan, 3316 Victoria Ct., Johnson City, Tenn. 37605

[21] Appl. No.: 712,480

[22] Filed: Sep. 5, 1996

[51] Int. Cl.⁶ .................................................. G09B 23/30
[52] U.S. Cl. .................................................. 434/267
[58] Field of Search ........................... 434/267, 272, 434/262

[56] References Cited

U.S. PATENT DOCUMENTS

| | | | |
|---|---|---|---|
| 2,324,702 | 7/1943 | Hoffman et al. | 434/272 |
| 2,704,897 | 3/1955 | Lade | 434/272 |
| 3,339,290 | 9/1967 | Doyle | 434/267 |
| 3,722,108 | 3/1973 | Chase | 434/267 |
| 3,789,518 | 2/1974 | Chase . | |
| 4,451,416 | 5/1984 | Burtscher . | |
| 4,481,001 | 11/1984 | Graham et al. | 434/267 |
| 5,314,339 | 5/1994 | Aponte | 434/262 X |
| 5,411,437 | 5/1995 | Weber et al. | 434/269 |
| 5,518,407 | 5/1996 | Greenfield et al. | 434/267 X |

*Primary Examiner*—Jeffrey A. Smith

[57] ABSTRACT

A syringe injection practice model is constructed of a skin-like layer of gel-like material having a consistency similar to that of human skin and being punctureable by a syringe needle in a simulated manner to abdominal insulin injection, the layer being mounted onto an outer surface of a base of cushion-like, fibrous fill material having an open cell configuration for allowing air to circulate therethrough. An outer surface of the base has a generally abdominal region configuration, an inner opposite surface is adapted to lie substantially flat on a substantially rigid, flat support. A breathable cloth wrapping substantially surrounds the layer and base and maintains their relative positions. The wrapped layer and base combination is mounted on a substantially flat, rigid support.

9 Claims, 2 Drawing Sheets

SYRINGE INJECTION PRACTICE DEVICE

BACKGROUND OF THE INVENTION

1. Field of the Invention

This invention concerns a syringe injection practice or training model particularly adapted for the demonstration of and learning the proper technique for insulin or other injection into the human abdominal region. This model provides a lifelike simulation in body appearance and feel, allowing the direct injection of practice fluids into the model and providing for rapid evaporation of the practice fluids therefrom.

Millions of Americans must regularly inject themselves in the abdomen with insulin for the treatment of diabetes. Because a needle hurts, one cannot repeatedly inject him or herself for the purpose of practice. Traditionally, nurses and diabetes educators have taught diabetics who require insulin injections how to administer them by drawing saline solution into a syringe and injecting, for example, an orange. However, an orange is hard and does not resemble flesh when punctured.

Because insulin is injected subcutaneously into body fat, patients are taught to pinch the fat before puncturing the skin. This is done to avoid injecting insulin into the underlying muscle, which would result in an undesirable rate of absorption and duration. Thus there is a need for a teaching device which can be pinched in a similar manner to pinching the skin of the abdominal region, and repeatedly injected in a simulated subcutaneous manner as opposed to intravenously, intramuscularly, or intradermally with liquid and which will give the needle a resistance similar to that of human flesh.

Use of the present model familiarizes the patient with the abdomen as a preferred injection site and reverses the common perception that all injections are given in the arms or buttocks. The model also allows the demonstration of how far apart each shot should be and how to rotate injection sites to allow the tissue to recover.

2. Prior Art

Teaching models are available for practicing intravenous, intramuscular, and intradermal as well as subcutaneous injection as shown, for example, in U.S. Pat. Nos. 5,411,437; 4,451,416; 3,789,518; and 5,314,339, the disclosures of which with regard to utility and materials of construction are incorporated herein in their entirety. None of these devices however present any model of an abdomen, particularly a clothed one, which can be injected subcutaneously with liquid in a highly simulative manner to actual abdominal injection, and which provides for evaporation of the practice fluid.

OBJECTS OF THE INVENTION

Objects, therefore of the present invention are: to provide a practice model for fluid injections, which model resembles the human abdominal region both by feel and by sight; to provide such a model with the capability to absorb, disperse, and evaporate syringe injected fluid so as to allow repeated use of the model; and to provide the model with clothing means or other covering means which is adapted for storing or transporting supplies which are used in the practice injection procedure.

SUMMARY OF THE INVENTION

The above and further objects hereinafter becoming evident have been attained in accordance with the present invention through the discovery of a practice device which is defined in it's broad sense as a practice model resembling the abdominal region of a human, said model comprising a thin, skin-like layer of gel-like material having an outer surface resembling an abdominal region and having a consistency similar to that of human skin, said layer being mounted onto a base of cushion-like, fibrous fill material having an open cell configuration for allowing air to circulate therethrough, said layer and base being substantially surrounded by a breathable cloth wrapping means for maintaining the relative positional integrity of said layer and base, said base with said layer and wrapping means thereon being mounted on a rigid support means with said outer surface of said layer facing outwardly therefrom.

In certain preferred embodiments:

(a) the model is covered by clothing means for providing the visual effect of a human abdominal region; and (b) pocket means are provided in said clothing means for the storage and transport of practice fluid injection materials.

DETAILED DESCRIPTION OF DRAWINGS

Figure 2:
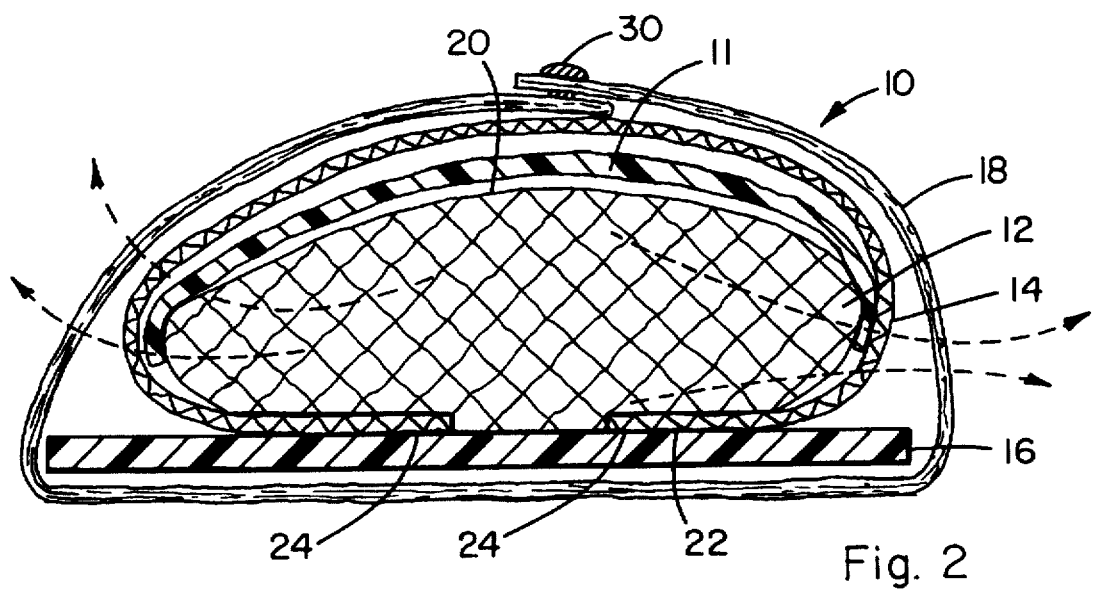
FIG. 2 is a cross-sectional view of the present model taken along line 2—2 of FIG. 1 in the direction of the arrows showing typical relative dimensions and positions of the model components with spaces between the components and component thicknesses shown exaggerated for purposes of clarity.
Figure 1:
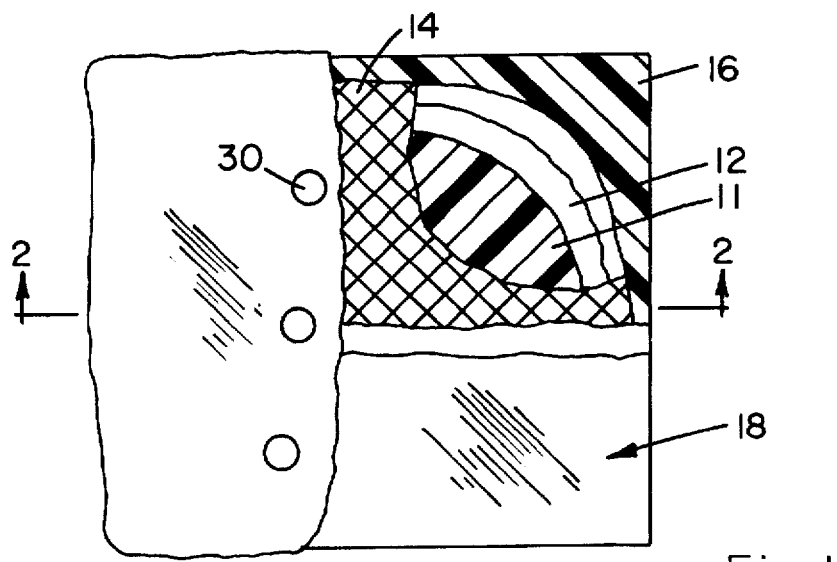
FIG. 1 is a vertical, two-dimensional cut-away of the present invention, showing the relative position of the model components.
Figure 3:
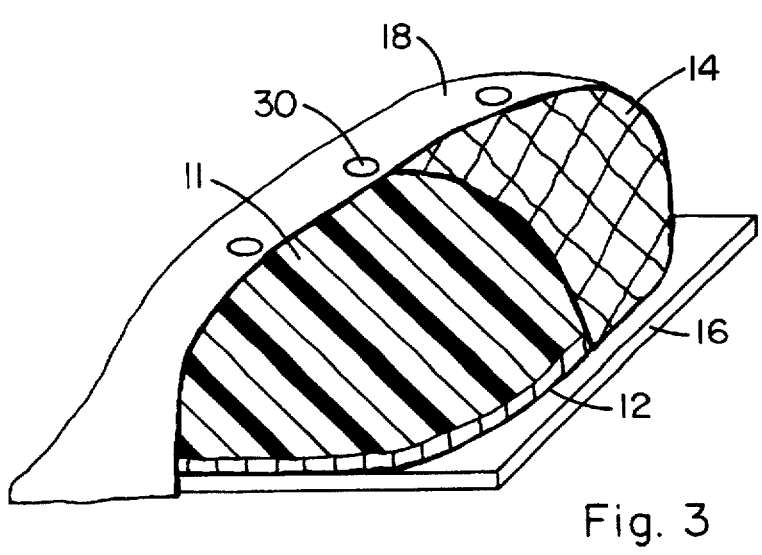
FIG. 3 is a three-dimensional perspective cut-away of the present model showing the relative positions of the components.
Figure 4:
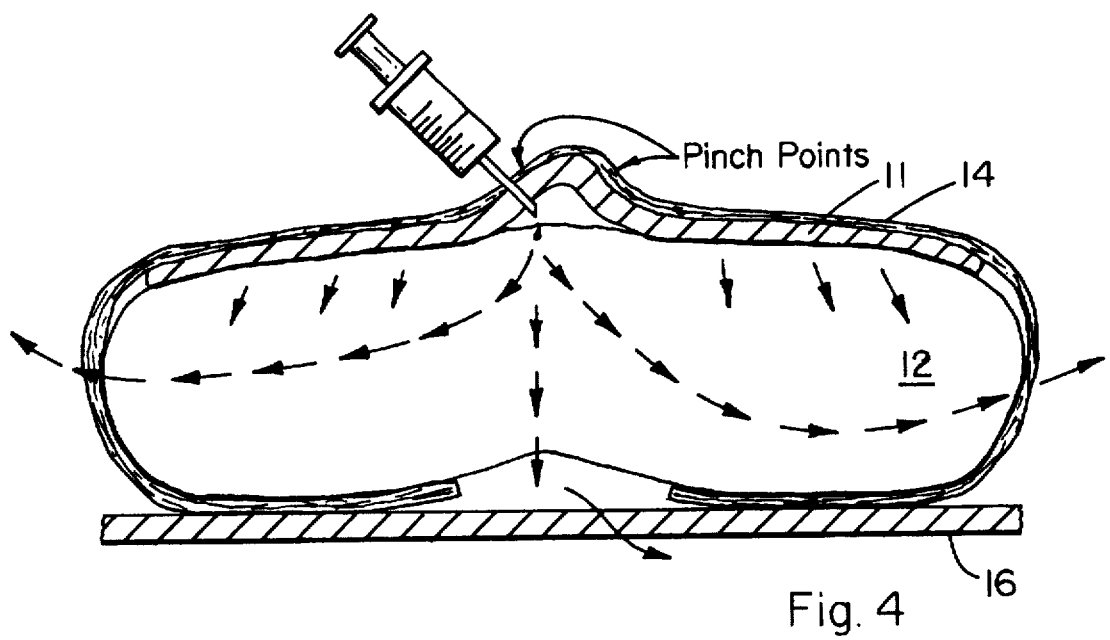
FIG. 4 is a cross-sectional view of the model as in FIG. 2 without the clothing covering, and showing the "skin" being pinched upwardly for receiving the needle.

Referring to the drawings of certain preferred embodiments, the present invention comprises a plurality of components which in combination provide a syringe injection practice model generally designated 10 having a size for easy transport, use and storage, a preferred embodiment having a size similar to an average human abdominal region as measured between the sternum and pelvic region, and preferably is substantially circular or square and covering an area of, for example, from about 60 to about 200 in$^2$, preferably from about 120 to about 160 in$^2$, although any convenient and easily transportable dimensions can be employed.

The model comprises the component of a relatively thin, e.g., ⅛ to about ½ inch thick layer of gel-like material 11, preferably plasticized poly(vinyl chloride), having a consistency similar to that of human skin and being mounted onto a base of cushion-like fill material 12 having an open cell configuration for allowing air to circulate therethrough.

Figure 5:
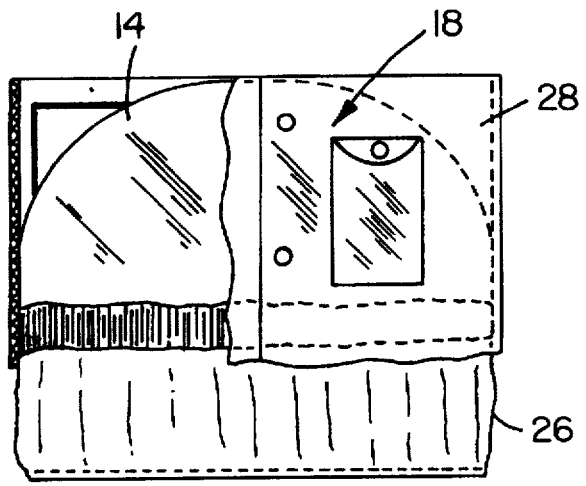
FIG. 5 is a top view of the present model with portions of a clothing covering cut away for clarity.

The layer 11 may also consist of plasticized elastomers of such materials as flexible, punctureable natural rubber, polyisoprene, polyolefins, polyurethane, silicone, or acrylic elastomers having characteristics similar to human skin. The integrated components of layer 11, base 12 and wrapping 14 are mounted on rigid support board means 16, and then covered, to the extent desired, by clothing means 18 providing third structure means having a desired visual effect of a clothed, human abdominal region. The clothing means may be, e.g., with reference to FIG. 5, a pair of elastic banded shorts 26 and a jacket 28 buttoned or snap fastened by such means as 30 around the model.

With specific reference to the claims hereof, layer 11 is mounted onto an outer surface 20 of base 12, the outer surface being of generally abdominal region configuration. The term "open cell" as used herein to describe base 12 indicates a high loft, fluffy, fibrous net-work or web thru which air can freely circulate and enchance transfer of injected fluid outwardly from the base means as shown by the dotted flow lines in FIG. 2. The fill material may be selected from materials such as polyester, polyamide, acrylic, or cellulosic fibers, or like fibers. The base means preferably has a compressibility similar to that of, e.g., a six foot tall, 190 pound male, i.e., about that of a foam cushion. In this regard, a variety of such compressibilities of a number of models can be provided to simulate a variety actual human weight conditions.

The base has an inner surface 22 adapted to lie substantially flat on support means 16, and said layer and base means forming first structure means. Breathable cloth wrapping 14 substantially surrounds the first structure and forms therewith second structure means. This second structure means is then mounted on substantially flat support means 16 such as heavy cardboard, plastic sheet, or the like by stapling, gluing or the like the inner edge portions 24 of wrapping 14 to support 16 to form thereby the third structure means.

Figure 6:
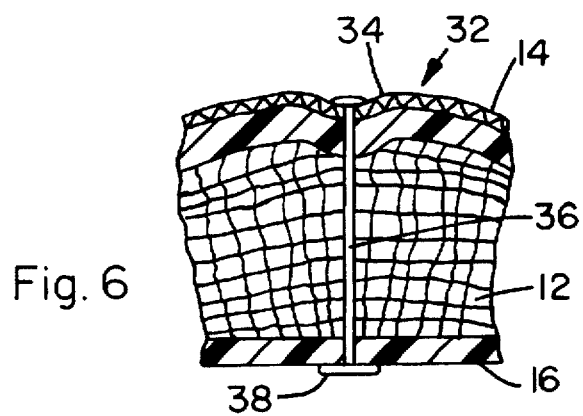
FIG. 6 is a cross-sectional view of a portion of FIG. 2 showing the use of a navel button device for providing the model with a true representation of the abdominal area.

With reference to FIG. 6, a central abdominal region 32 of the model in the area of the navel 34 is recessed to resemble the human anatomy by way of a cord 36 fastened at one end to wrapping 14 as by sewing, and fastened at its other end to a button or the like 38 on the underside of support 16.

The invention has been described in detail with particular reference to preferred embodiments thereof, but it will be understood that variations and modifications will be effected with the spirit and scope of the invention.

I claim:

1. A syringe injection practice model comprising the components of a skin simulating layer of gelatinous material having a consistency similar to that of human skin and being punctureable by syringe needle means in a simulated manner to abdominal insulin injection, said layer being mounted onto an outer surface of a cushion base means of fibrous fill material having an open cell configuration for allowing air to circulate therethrough, said outer surface of said base means being of generally abdominal region configuration, said base means having an inner surface adapted to lie substantially flat on support means, said layer and base means forming first structure means, breathable cloth wrapping means substantially surrounding said first structure means and maintaining the relative positional integrity of said components thereof and thereby forming second structure means, said second structure means being mounted on substantially flat support means to form third structure means.

2. The model of claim 1 wherein said gelatinous material has the characteristics similar to human skin and is selected from the group consisting of flexible, punctureable natural rubber, polyisoprene, polyolefins, plasticized poly (vinyl chloride), polyurethane, silicone, or acrylic elastomers.

3. The model of claim 1 wherein said fill material is selected from the group consisting of polyester, polyamide, acrylic or cellulosic fibers which are intermeshed to give a fiber web structure of a density which allows air movement within said fiber web structure.

4. The model of claim 3 wherein said fill material is of hydrophobic polyamide whereby evaporation of practice injection fluid is enhanced.

5. The model of claim 3 wherein fill material fiber is of polyamide.

6. The model of claim 1 wherein said third structure means is substantially covered with removable clothing article means.

7. The model of claim 1 wherein said layer has a substantially uniform thickness of from about ⅛ to about ½ inch.

8. The model of claim 1 wherein said layer covers an area of from about 60 to about 200 in$^2$.

9. The model of claim 1 wherein navel button means is provided to form a natural appearing navel indentation in said model.

* * * * *